United States Patent

[11] 3,620,894

| [72] | Inventor | Frank Oates<br>Birmingham, England |
|---|---|---|
| [21] | Appl. No. | 852,551 |
| [22] | Filed | Aug. 25, 1969 |
| [45] | Patented | Nov. 16, 1971 |
| [73] | Assignee | Southalls (Birmingham) Limited<br>Birmingham, England |
| [32] | Priority | Sept. 9, 1968 |
| [33] | | Great Britain |
| [31] | | 42,770 |

[54] INCONTINENCE PADS
2 Claims, 4 Drawing Figs.

[52] U.S. Cl. .............................................. 161/114,
128/296, 156/253, 156/291, 161/147, 161/148,
161/149
[51] Int. Cl. ....................................................... B32b 3/06,
B32b 3/10
[50] Field of Search ........................................... 128/284,
287, 288, 290, 292, 296; 161/80, 81, 112–115,
146–149, 154, 155, 156, 53; 156/290, 291, 253

[56] References Cited
UNITED STATES PATENTS

| 3,051,171 | 8/1962 | Liloia et al. ................ | 161/154 |
| 3,345,643 | 10/1967 | Bradley ..................... | 161/115 X |
| 3,416,522 | 12/1968 | Yeremian .................. | 161/112 |

*Primary Examiner*—William A. Powell
*Attorney*—Holman & Stern

ABSTRACT: An incontinence pad comprising a moisture impervious backing sheet and a moisture pervious surfacing sheet, the two sheets having layers of absorbent material therebetween, the layers of absorbent material being spiked before assembly between the sheets to produce interlocking elements which serve to retain the layers together and the backing sheet being secured to the adjacent absorbent layer by adhesive.

PATENTED NOV 16 1971 3,620,894
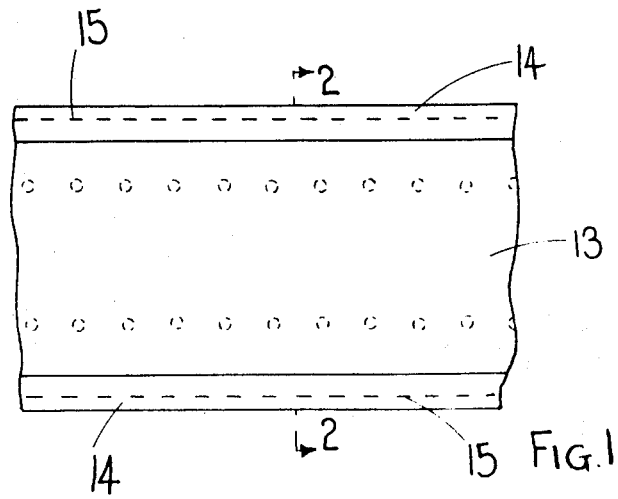
FIG.1
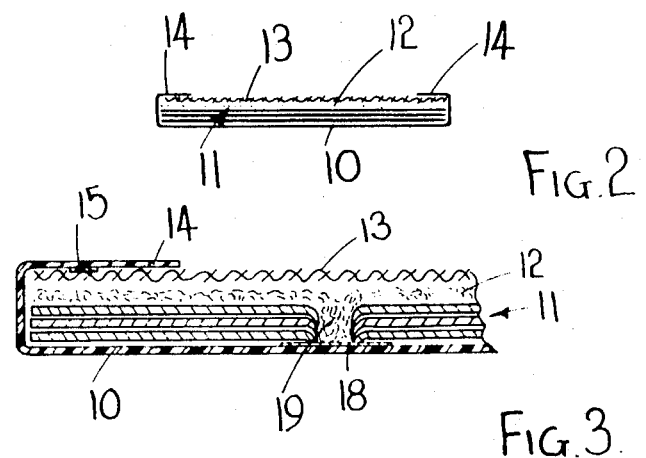
FIG.2
FIG.3
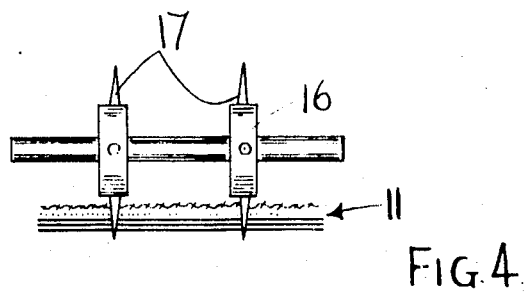
FIG.4
INVENTOR
Frank Oates
BY
ATTORNEYS

INCONTINENCE PADS

This invention relates to incontinence pads of the kind comprising a moisture impervious backing sheet, a plurality of layers of absorbent material disposed on one side of the backing sheet and a moisture pervious surfacing sheet disposed on the remote side of the layers of absorbent material from the backing sheet, the backing sheet being secured to the surfacing sheet in order to contain the layers of absorbent material.

With such a pad there is a tendency for the layers of absorbent material to move about between the aforesaid sheets particularly when a patient is lying of the pad.

The object of the invention is to provide such a pad and a method of making same in a simple and convenient form.

In the accompanying drawings:

FIG. 1 is a plan view of one example of an incontinence pad in accordance with the invention FIG. 2 is a section on the line 2—2 of FIG. 1

FIG. 3 is a sectional view to an enlarged scale, and

FIG. 4 is a view of a spiking roller for use when carrying out the method of the invention.

With reference to the drawings, there is provided a moisture impervious backing sheet 10 conveniently formed as a film of plastics material. Positioned on one side of the backing sheet is a plurality of layers of absorbent material 11. The layer 12 remote from the backing sheet 10 consists of a web of natural and/or synthetic fibers such as cotton wool and the remaining layers are paperlike and are formed from wood cellulose wadding. The layers together define an absorbent pad of a width slightly less than the width of the impervious backing sheet 10.

Overlying the layers of absorbent material is a moisture pervious surfacing sheet 13 having substantially the same width as the layers 11 of absorbent material. The surfacing sheet is conveniently formed by a plastics net and it is secured to the backing sheet by folding the latter around the edges of the pad and securing the edge portions 14 by lines of adhesive 15.

Such a pad is very well known but it has the disadvantage that there is no positive location for the layers 11 of absorbent material and there is tendency for these to move about between the sheets 10 and 13 particularly when a patient is lying on the incontinence pad. This movement results in the formation of humps on the surface of the pad which is exposed to the user and this causes discomfort to the user as well as impairing the efficiency of the pad.

In order to minimize such movement the layers of absorbent material prior to being assembled to the backing sheet, are spiked by means of a spiked roller 16. The spikes 17 of the roller force cotton wool fibers from the layer 12 down into the holes produced by the spikes in the remaining layers as well as displacing material between the layers and this has the effect of producing interlocking elements 19 which extend towards the backing sheet and interlock the layers together. In addition, the layer adjacent the backing sheet is secured thereto by means of adhesive 18. As shown, the spiked roller 16 produces two lines of holes adjacent the edges respectively of the incontinence pad and prior to the assembly of the layers of absorbent material to the backing sheet, the latter is provided with two lines of adhesive 18 spaced by approximately the distance of the lines of holes produced by the roller. The adhesive adheres to the free ends of the interlocking elements as well as to the adjacent layer and thereby the elements are retained in the aforesaid holes to provide more positive interlocking of the layers. It will be appreciated that any number of lines of spiked holes may be provided as required and depending upon the width of the incontinence pad.

Having thus described my invention what I claim as new and desire to secure by Letters Patent is:

1. An incontinence pad of the kind comprising a moisture impervious backing sheet, a plurality of layers of absorbent material disposed on one side of the backing sheet and a moisture pervious surfacing sheet disposed on the remote side of the layers of absorbent material from the backing sheet, the backing sheet being secured to the surfacing sheet in order to contain the layers of absorbent material, interlocking elements extending through the layers of absorbent material and which lock the layers together, and adhesive means acting to secure the ends of the interlocking elements to the impervious backing sheet.

2. An incontinence pad according to claim 1 in which the absorbent layer remote from the backing sheet is formed from cotton wool fibers, said interlocking elements being composed of cotton wool fibers extending through the remaining absorbent layers.